(No Model.)

W. MEYER.
ANNEALING PAN.

No. 564,568. Patented July 21, 1896.

Witnesses
Geo. E. Fuchs.
Hubert Peck.

Inventor
Wm. Meyer,
by Pattison & Nesbit
Attorneys

UNITED STATES PATENT OFFICE.

WILLIAM MEYER, OF BEAVER FALLS, PENNSYLVANIA.

ANNEALING-PAN.

SPECIFICATION forming part of Letters Patent No. 564,568, dated July 21, 1896.

Application filed March 11, 1895. Serial No. 541,311. (No model.)

*To all whom it may concern:*

Be it known that I, WILLIAM MEYER, of Beaver Falls, in the county of Beaver and State of Pennsylvania, have invented certain new and useful Improvements in Annealing-Pans; and I do hereby declare the following to be a full, clear, and exact description of the invention, such as will enable others skilled in the art to which it pertains to make and use it, reference being had to the accompanying drawings, which form part of this specification.

This invention relates to improvements in glassware-annealing pans.

This invention consists in certain novel features of construction and in combinations and arrangements of parts more fully and particularly pointed out and described hereinafter.

Figure 1:
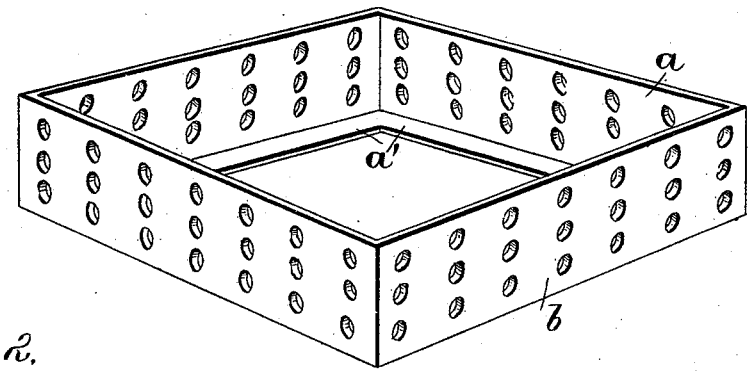
Figure 2:
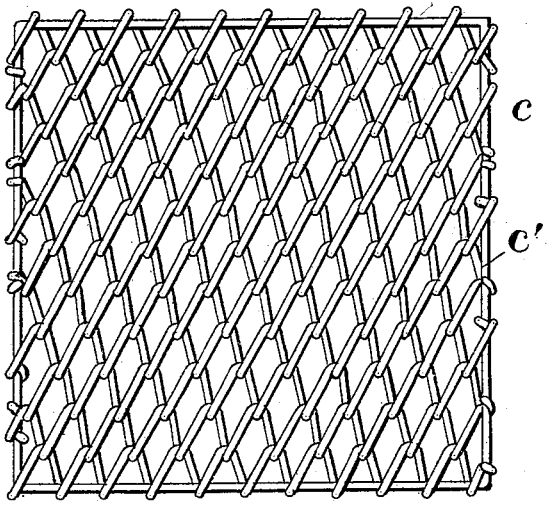
Figure 3:
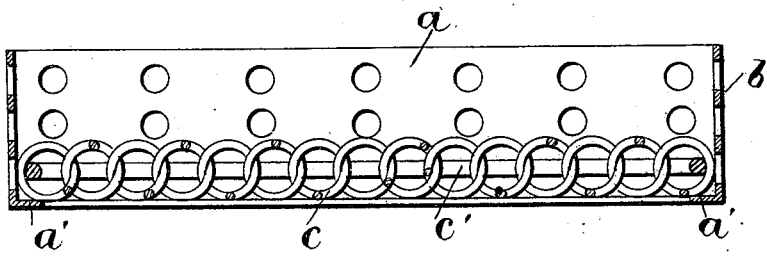

Referring to the accompanying drawings, Figure 1 is a perspective view of the frame of the pan with the bottom or floor removed. Fig. 2 is a detail top plan view of the removable bottom or floor formed of woven-wire fabric. Fig. 3 is a cross-sectional view of the completed pan.

The pan $a$ can be of any desired shape, open at the top, and if desired open at the lower end with the flanges $a'$ to receive a removable floor or bottom on which the glass articles rest while being annealed. The sides $b$ of the pan can be perforated if desirable, and the floor $c$ is made of open-work, preferably in the shape of stiff interlocking or woven-wire coils stiffened by a surrounding frame $c$.

Material advantages are thus attained by employing a leer-pan with an open-work metal floor, as the glassware is not subjected to the unequal expansion and contraction consequent to the employment of a solid metal floor-plate, and the glass on entering the furnace is quickly and evenly heated throughout, the open-work metal floor permitting ready and direct access of the heat and gases from the furnace to the glass articles without requiring conduction through the pan floor to heat or cool the articles thereon; also the body of metal in the open-work floor is not sufficient to materially affect the heating or cooling of the glass articles thereon, so that all the articles on the floor are heated by the direct application of the heat from the furnace and cooled by the direct contact of the cooler air, and also the points of contact between the floor and the glass articles are so small in area as to aid in preventing the degree of temperature of the floor seriously affecting the annealing of the glassware. These advantages are materially aided by the employment of the woven-wire floor, which fulfils the requirements of small points of contact and large and numerous openings.

Having thus fully described my invention, what I claim as new, and desire to secure by Letters Patent of the United States, is—

The leer-pan shown and described composed of the metal frame having a removable floor of woven-wire fabric on which the glassware articles rest while being subjected to the intense annealing heat and which is so formed in connection with the frame as to prevent warping under the intense heat and consequent disturbing of the glassware thereon, substantially as shown and described.

In testimony whereof I affix my signature in presence of two witnesses.

WILLIAM MEYER.

Witnesses:
CHAS. MILLER,
W. E. PICKERING.